US005973054A

United States Patent [19]

Kushino et al.

[11] Patent Number: 5,973,054

[45] Date of Patent: Oct. 26, 1999

[54] COLORED MINUTE PARTICLES

[75] Inventors: Mitsuo Kushino, Hyogo; Nobuaki Urashima, Nara; Makoto Matsumoto, Osaka; Tatsuhito Matsuda, Hyogo; Kazuhiro Anan, Osaka, all of Japan

[73] Assignee: Nippon Shokubal Co., Ltd., Japan

[21] Appl. No.: 08/906,052

[22] Filed: Aug. 5, 1997

[30] Foreign Application Priority Data

| | | | |
|---|---|---|---|
| Aug. 5, 1996 | [JP] | Japan | 8-206201 |
| Aug. 5, 1996 | [JP] | Japan | 8-206202 |

[51] Int. Cl.[6] ..................... C08F 2/20; C08F 2/18; C08L 93/04; G03C 9/00

[52] U.S. Cl. .................... 524/457; 524/458; 524/459; 524/460; 524/461; 524/764; 430/106; 430/109; 430/137; 526/201

[58] Field of Search .................... 524/457, 458, 524/459, 460, 461, 764; 526/201; 430/106, 109, 137

[56] References Cited

U.S. PATENT DOCUMENTS

| | | | |
|---|---|---|---|
| 3,959,153 | 5/1976 | Sadamatsu et al. | 430/137 |
| 4,592,990 | 6/1986 | Takagi et al. . | |

FOREIGN PATENT DOCUMENTS

| | | |
|---|---|---|
| 0 038 208 | 10/1981 | European Pat. Off. . |
| 0 531 932 | 3/1993 | European Pat. Off. . |
| 56-97353 | 8/1981 | Japan . |
| 60-254050 | 12/1985 | Japan . |
| 6-75429 | 3/1994 | Japan . |
| 07199536 | 8/1995 | Japan . |

OTHER PUBLICATIONS

Astenal Laboratories, Incorporated v. Nobilium Processing Company of Chicago et al. 115 USPQ44 (DCNILL), Jun. 1957.

Petrolite Corporation v. Watson, Comr Pats. 113 USPQ 248 (DC DC), Mar. 1957.

*Primary Examiner*—Peter A. Szekely
*Attorney, Agent, or Firm*—Fish & Richardson P.C.

[57] ABSTRACT

A method which produces colored minute particles by suspending in an aqueous suspending medium a polymerizable monomer composition obtained by dispersing a coloring agent at least in a polymerizable monomer and polymerizing the resultant suspension is characterized in that the dispersion of the coloring agent in the polymerizable monomer is performed in the presence of a dispersing agent, the polymerizable monomer composition exhibits a viscosity of not more than 300 cP, and the suspension of the polymerizable monomer composition in the aqueous suspending medium exhibits a viscosity of not more than 100 cP. The dispersing agent is at least one resin selected from the group consisting of rosin derivatives, aromatic petroleum resins, pinene type resins, epoxy type resins, cumdrone resins, and styrene-acryl type resins.

11 Claims, No Drawings

COLORED MINUTE PARTICLES

FIELD OF THE INVENTION

This invention relates to colored minute particles, an electrophotographic toner using the minute particles, and a method for the production thereof, and more particularly to colored minute particles excelling in dispersibility and stability of electrification, an electrophotographic toner using the minute particles, and a method for the production thereof.

PRIOR ART

Colored minute particles which are obtained by dispersing a varying pigment represented by carbon black in a varying resinous material are widely used, for example, as a raw material for an electrophotographic toner.

As means to produce the colored minute particles, a method of fusion kneading which comprises compounding a pigment component and a resinous material, fusion kneading the resultant blend, and then cooling and pulverizing the kneaded blend thereby producing colored minute particles, a method of suspension polymerization which comprises dispersing a pigment component in a polymerizable monomer and suspension polymerizing the resultant dispersion in an aqueous medium thereby producing colored minute particles, and the like have been known.

In these methods, the method of suspension polymerization has come to find increasing utility in recent years because it is capable of producing minute particles which have a relatively uniform size distribution and assume a spherical shape.

Most coloring agents like carbon black, however, have weak affinity for other substances such as, for example, water, organic solvents, and organic macromolecules as compared with the cohesive force among the coloring agent particles and tend to succumb to secondary aggregation. When the suspension polymerization mentioned above is to be carried out, therefore, how the coloring agent should be homogeneously dispersed in the monomer poses a problem.

JP-A-60-254,050 discloses a method which relies on the addition of a phenol-terpene copolymer to improve the stability of the suspension polymerization where the monomer mixer has incorporated such additives as carbon black and a charge controlling agent.

JP-A-07-199,536 discloses a method which improves the dispersibility of a coloring agent by the addition of a monomer or polymer having a polar functional group in an oil phase, particularly a monomer or polymer of sodium styrene sulfonate or of p-carboxy styrene. Examples cited in this patent publication uses very small amounts of an anionic surfactant (sodium dodecylbenzene sulfonate) and tricalcium phosphate as suspension dispersion stabilizers.

The addition of such a substance as phenol-terpene copolymer or a monomer or polymer containing a polar functional group in the oil phase improves the stability of suspension polymerization or improves the dispersion of a coloring agent in a polymerizable monomer as compared with the absence of this addition. The dispersion attained by this addition has no ample stability and soon begins to aggregate. Since the stability of dispersion in the polymerizable monomer is insufficient and the stability of dispersion of the monomer during the course of suspension and polymerization is inferior and the resultant suspension and polymerization are localized or aggregated, the dispersion of the coloring agent in the colored minute particles resulting from the polymerization is not homogeneous and the homogeneity of the amount of the coloring agent present among the individual particles is degraded as well.

When the stability of dispersion of the coloring agent in the polymerizable monomer composition is insufficient, the coloring agent aggregates and the composition gains in viscosity. When the viscosity of the polymerizable monomer composition is high, the drops of the polymerizable monomer composition produced by suspending the composition in an aqueous suspending medium by the known method are finely divided only with difficulty and give rise predominantly to coarse particles exceeding 10 mm in diameter. The drops of the composition in the suspension have low stability and induce coalescence of the monomer particles during the course of polymerization and cause adhesion of the produced polymer to the stirring vanes and the polymerization kettle. Thus, the polymerization cannot be accomplished stably with a fully satisfactory yield.

It has been necessary, therefore, to reduce the drops of the polymerizable monomer composition to minute particles and allay growth of coarse particles by such a specific method as is disclosed in JP-A-07-199,536 or a method of performing the treatment of suspension by stirring for a long time.

When the stability of dispersion of the coloring agent in the polymerizable monomer composition is insufficient, the coloring agent migrates into the water phase of the composition during the course of suspension of the composition in an aqueous medium and the polymerization of the composition. As a result, the coloring power of the produced colored minute particles is lowered, the raw materials are wasted, and the free coloring agent which has migrated into the water phase induces various problems such as staining the colored minute particles and polluting the effluent from the shop. This adversity is prominent particularly when the coloring agent has a hydrophilic group like carbon black.

When hydrophilic inorganic minute particles such as of a sparingly soluble inorganic salt are used as a stabilizer for suspension and dispersion, the produced suspension is suffered to gain in viscosity and manifest thixotropy on account of the structural viscosity which the minute particles forms in a water phase. This phenomenon tends to grow in accordance as the temperature rises. The additional use of a surfactant in a trace amount is resorted to for the purpose of precluding this adverse phenomenon. This measure, however, does not turn out to be a decisive relief.

For the purpose of uniformizing the stirring and eliminating dispersion of the temperature distribution during the course of polymerization, therefore, it is necessary to exalt the stirring power. The exalted stirring power, however, causes the particles in the suspension to coalesce into coarse particles and, as a consequence, impairs the stability of polymerization.

For expelling the stabilizer of suspension and dispersion from the produced polymer, it is necessary to subject this polymer to a treatment with an acid and to a complicated cleaning operation.

The stabilizer for dispersion of a macromolecule does not appreciably increase the viscosity of such a suspension as uses a sparingly soluble inorganic salt and inorganic minute particles mentioned above but heightens the viscosity of a suspension such that the stability of dispersion of the coloring agent in the polymerizable monomer composition is low and the coloring agent tends to migrate into the water phase.

Since this trend becomes prominent when the content or the concentration of the polymerizable monomer composition in the suspension is heightened, it has been difficult to heighten the concentration and, at the same time, augment the efficiency of production.

The stabilizer for dispersion of a macromolecule defies removal by washing and persists on the surface of the colored minute particles. When the colored minute particles entraining the stabilizer is used as a toner, therefore, the stabilizer lowers the flowability of the toner and degrades the stability of the environment.

SUMMARY OF THE INVENTION

The present invention, therefore, has for an object thereof the provision of colored minute particles possessed of improved properties, an electrophotographic toner using the colored minute particles, and a method for the production thereof. This invention particularly aims to provide colored minute particles excelling in dispersibility and stability of electrification, an electrophotographic toner using the colored minute particles, and a method for the production thereof.

The objects mentioned above are accomplished by a method for producing colored minute particles by suspending in an aqueous suspending medium a polymerizable monomer composition obtained by dispersing a coloring agent at least in a polymerizable monomer and polymerizing the resultant suspension, characterized by performing the dispersion of the coloring agent in the polymerizable monomer in the presence of a dispersing agent, the polymerizable monomer composition exhibiting a viscosity of not more than 300 cP, and the suspension of the polymerizable monomer composition in the aqueous suspending medium exhibiting a viscosity of not more than 100 cP.

This invention further provides a method for producing the colored minute particles set forth above, wherein the dispersing agent for dispersing the coloring agent in the polymerizable monomer is at least one resin selected from the group consisting of rosin derivatives, aromatic petroleum resins, pinene type resins, epoxy type resins, coumarone resins, and styrene-acrylic type resins.

The objects mentioned above are further accomplished by a method for producing colored minute particles by suspending in an aqueous suspending medium a polymerizable monomer composition obtained by dispersing a coloring agent at least in a polymerizable monomer and polymerizing the resultant suspension, characterized by performing the dispersion of the coloring agent in the polymerizable monomer in the presence of at least one resin selected from the group consisting of rosin derivatives, aromatic petroleum resins, pinene type resins, epoxy type resins, coumarone resins, and styrene-acrylic type resins and the residual ratio of the coloring agent in the colored minute particles is not less than 70%.

This invention further provides a method for producing colored minute particles set forth above, wherein the dispersing agent for dispersing the coloring agent in the polymerizable monomer is used in an amount in the range of 1–50 parts by weight, based on 100 parts by weight of the polymerizable monomer composition obtained by dispersing the coloring agent at least in the polymerizable monomer.

This invention further provides a method for producing colored minute particles set forth above, wherein the dispersing agent for dispersing the coloring agent in the polymerizable monomer is at least one resin selected from the group consisting of rosin derivatives having an acid number in the range of 5–100 KOH mg/g, aromatic petroleum resins having a weight average molecular weight of not more than 10000 and a softening point in the range of 70° C.–170° C., α-pinene type resins, epoxy type resins having a softening point in the range of 60° C.–150° C., coumarone resins, and styrene-acrylic type resins.

The objects mentioned above are further accomplished by colored minute particles obtained by any of the methods of production set forth above.

This invention further provides colored minute particles set forth above, wherein the colored minute particles contain at least one resin selected from the group consisting of rosin derivatives, aromatic petroleum resins, pinene type resins, epoxy type resins, and coumarone resins and the content of the coloring agent in the colored minute particles is not less than 5% by weight.

The objects mentioned above are further accomplished by an electrophotographic toner characterized by containing the colored minute particles set forth above.

According to this invention, the coloring agent is dispersed homogeneously in the produced colored minute particles and the content of the coloring agent among the individual colored minute particles is highly uniform. When the colored minute particles of this quality are used in an electrophotographic toner, therefore, the image produced with the toner is completely satisfactory in terms of the degree of coloration and the degree of density and the possibility of the image generating such inconveniences as fogging is eliminated. In the polymerizable monomer composition which has undergone a treatment for the dispersion of the coloring agent in the polymerizable monomer in the presence of such a specific resin as mentioned above, the coloring agent migrates only sparingly into the water phase during the course of the suspension in the aqueous suspending medium and the polymerization of the suspension. As a result, the residual ratio of the coloring agent in the produced colored minute particles is heightened and the problem of the pollution with the free coloring agent which has migrated into the water phase is eliminated. All these factors favor the convenience of production.

DETAILED DESCRIPTION OF PREFERRED EMBODIMENTS OF THE INVENTION

This invention will be described more specifically below with reference to embodiments thereof.

The first aspect of this invention, in producing colored minute particles by suspending in an aqueous medium a polymerizable monomer composition obtained by dispersing a coloring agent in a polymerizable monomer capable of forming a binding resin by polymerization and then polymerizing the resultant suspension, effects the dispersion of the coloring agent in the polymerizable monomer in the presence of a dispersing agent. When the dispersion of the coloring agent in the presence of a dispersing agent as described above, the dispersibility of the coloring agent in the polymerizable monomer composition is improved and the viscosity of the polymerizable monomer composition is lowered. The fact that this viscosity is not more than 300 cP, preferably not more than 250 cP, and more preferably in the range of 200–1 cP characterizes the present invention.

Since the viscosity of the polymerizable monomer composition is low as stated above, the drops of the composition having a necessary particle diameter can be quickly obtained and the possibility of the composition giving rise to crude particles can be notably diminished by resorting to the standard method of suspension used by a person of ordinary skill in the art instead of adopting any special method or performing the treatment of suspension by stirring with high shearing force for a long time. Further, since the dispersibility of the coloring agent in the polymerizable monomer composition is satisfactory, the migration of the coloring agent onto the water phase is depleted.

The suspension of the polymerizable monomer composition which is obtained as described above consequently has low viscosity. Since this viscosity is specifically not more than 100 cP, preferably not more than 80 cP, and more preferably in the range of 50–1 cP, the suspension during the course of polymerization can be homogeneously mixed by gentle stirring without entraining the occurrence of coarse particles. Consequently, the stability of polymerization is very satisfactory and the yield is high.

As a result, the coloring agent is uniformly dispersed in the produced colored minute particles and the content of the coloring agent is highly uniform among the individual colored minute particles. Further, the problems concerning the production such as the pollution of the environment due to the migration of the coloring agent to the aqueous medium and the increase of the cost of raw materials can be eliminated.

Since the polymerizable monomer composition has low viscosity as described above, the polymerization can be stably completed even when a surfactant alone is used as a stabilizer for suspension and dispersion. When the surfactant alone is used as the stabilizer for suspension and dispersion, the dispersibility of the coloring agent in the polymerizable monomer and the stability of dispersion are required to be on higher grades than when such a high polymer type stabilizer as polyvinyl alcohol and such a sparingly soluble inorganic salt as calcium phosphate which have been heretofore used as stabilizers for suspension and dispersion are used. When the surfactant alone is used as a stabilizer for suspension and dispersion in a system which is deficient in dispersibility and stability of dispersion, the disadvantage inevitably ensues that the stability of dispersion of the drops of the polymerizable monomer composition (oil phase) is lowered during the course of suspension and polymerization and the adhesion of the drops to the vessels for aggregation and polymerization and the stirring vanes occurs. In this invention, however, the use of the surfactant alone as the stabilizer for suspension and dispersion does not entail such inconveniences as described above because the stability of dispersion of the coloring agent in the polymerizable monomer is extremely improved and the viscosity of the composition is lowered by performing the treatment for dispersion of the coloring agent in the polymerizable monomer in the presence of such a dispersing agent as is described above. Owing to the use of the surfactant alone as the stabilizer for suspension and dispersion, the necessity for performing a complicated procedure of repeating many times such steps of solving and washing the stabilizer of dispersion with an acid or an alkali after completion of the polymerization as are required when a sparingly soluble inorganic salt is used can be obviated and the process of production can be simplified. The second aspect of this invention, in producing colored minute particles by suspending in an aqueous medium a polymerizable monomer composition obtained by dispersing a coloring agent in a polymerizable monomer capable of forming a binding resin by polymerization and then polymerizing the resultant suspension, effects the dispersion of the coloring agent in the polymerizable monomer in the presence of at least one resin selected from the group consisting of rosin derivatives, aromatic petroleum resins, pinene type resins, epoxy type resins, coumarone resins, and styrene-acrylic type resins and improves consequently the stability of dispersion of the coloring agent in the polymerizable monomer. When the treatment of dispersion of the coloring agent in the polymerizable monomer is carried out in the presence of such a specific resin as is mentioned above, the stability of dispersion of the coloring agent in the polymerizable monomer is improved and the dispersion of the coloring agent in the produced colored minute particles is uniformized and the uniformity of the content of the coloring agent among the individual colored minute particles is heightened. In the polymerizable monomer composition which has undergone a treatment for the dispersion of the coloring agent in the polymerizable monomer in the presence of such a specific resin as mentioned above, the coloring agent migrates only sparingly into the water phase during the course of the suspension in the aqueous suspending medium and the polymerization of the suspension. As a result, the residual ratio of the coloring agent in the produced colored minute particles is heightened and the problem of the pollution caused by the free coloring agent which has migrated into the water phase is eliminated.

In this invention, it is important that the treatment for the dispersion of the coloring agent be carried out in the presence of at least one resin selected from the group consisting of rosin derivatives, aromatic petroleum resins, pinene type resins, epoxy type resins, coumarone resins, and styrene-acrylic type resins which are dispersing agents for coloring agents. The addition of the dispersing agent after the treatment for the dispersion of the coloring agent is ineffective.

The polymerizable monomer to be used in the method of this invention for the production of colored minute particles has no particular restriction except the sole requirement that it be capable of succumbing to suspension polymerization. The various vinyl type monomers generally used in the field of toners such as, for example, styrene type monomers including styrene, o-methyl styrene, m-methyl styrene, p-methyl styrene, α-methyl styrene, p-methoxy styrene, p-tert-butyl styrene, p-phenyl styrene, o-chlorostyrene, m-chlorostyrene, and p-chlorostyrene; (meth)acrylic ester type monomers including methyl acrylate, ethyl acrylate, n-butyl acrylate, isobutyl acrylate, dodecyl acrylate, stearyl acrylate, 2-ethylhexyl acrylate, tetrahydrofurfuryl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate; olefin type resins including ethylene, propylene, and butylene; and acrylic acid, methacrylic acid, vinyl chloride, vinyl acetate, acrylonitrile, methacryl amide, methacryl amide, and N-vinyl pyrrolidone may be used either singly or in the form of a mixture of two or more members. Among other vinyl type monomers mentioned above, a styrene type monomer and/or a (meth) acrylic ester type monomer is preferred to constitute the main component of the polymerizable monomer. From the viewpoint of the fixability at low temperatures and the shelf life, it is preferable to form a styrene type-(meth) acrylic ester type copolymer by using a styrene type monomer and a (meth) acrylic ester type monomer. Further, in terms of the thermal properties to be exhibited by a toner obtained by using a binding resin, a styrene- (meth) acrylic ester mixture containing not less than 50% by weight of styrene proves particularly appropriate.

In the production of colored minute particles by the suspension polymerization of the polymerizable monomer component as described above, the monomer component may contain therein other polymers such as, for example, polyester. It may further contain suitably such known additives as a chain transfer agent for the purpose of adjusting the polymerization degree. It may also use a cross-linking agent during the course of suspension polymerization.

As concrete examples of the cross-linking agent, aromatic divinyl compounds such as divinyl benzene, divinyl naphthalene, and derivatives thereof; diethylenically unsaturated carboxylic esters such as ethylene glycol dimethacrylate, diethylene glycol dimethacrylate, triethylene glycol dimethacrylate, trimethylol propane triacrylate, allyl methacrylate, t-butyl aminoethyl methacrylate, tetraethylene glycol dimethacrylate, and 1,3-butanediol dimethacrylate; and all the divinyl compounds of N,N-divinyl aniline, divinyl ether, divinyl sulfide, and divinyl sulfonic acid, and compounds containing three or more vinyl groups may be cited.

Polybutadiene, polyisoprene, unsaturated polyesters, and chlorosulfonated polyolefins are likewise effective.

The coloring agent to be dispersed in the polymerizable monomer described above belongs to the pigments universally known to persons skilled in the art. The pigments may be organic pigments, inorganic pigments, and mixtures thereof.

As concrete examples of the inorganic pigments, carbon black, alumina, titanium dioxide, barium titanate, magnesium titanate, calcium titanate, strontium titanate, zinc oxide, silica sand, clay, mica, tabular spar, diatomaceous earth, various inorganic oxide pigments, chromium oxide, cerium oxide, iron oxide red, antimony trioxide, magnesium oxide, zirconium oxide, barium sulfate, barium carbonate, calcium carbonate, fine silica powder, silicon carbide, silicon nitride, boron carbide, tungsten carbide, titanium carbide, and cerium oxide available in the form of a powder or particles may be cited. These inorganic pigments may have been treated with any of known agents such as titanium coupling agents, silane coupling agents, or metal salts of higher fatty acids which are used for the impartation of hydrophobicity.

As concrete examples of the organic pigments, yellow pigments such as naples yellow, naphthol yellow S, Hansa Yellow G, Hansa Yellow 10G, benzidine yellow G, benzidine yellow GR, quinoline yellow lake, permanent yellow NCG, and Tatrazine lake, orange pigments such as molybdenum orange, permanent orange RK, benzidine orange G, and Indanthrene Brilliant Orange GK, red pigments such as permanent red 4R, resol red, pyrrazorone red 4R, Watchung Red Ca, lake red D, brilliant carmine 6B, eosine lake, rhodamine lake B, alizarin lake, and brilliant carmine B, purple pigments such as fast violet B and methyl violet lake, blue pigments such as alkali blue lake, victoria blue lake, phthalocyanine blue, nonmetallic phthalocyanine blue, partial chloride of phthalocyanine blue, fast sky blue, and Indanthrene Blue BC, and green pigments such as Malachite Green lake and Fanal Yellow green G may be cited.

For the purpose of producing a magnetic toner, the powder of such a ferromagnetic metal as iron, cobalt, or nickel or the magnetic powder of such a metal compound as magnetite, hematite, or ferrite may be added. Since the magnetic powder concurrently functions as a coloring agent, it may be used either alone or in combination with the pigment mentioned above for the production of the magnetic toner.

In this invention, the amount of the coloring agent to be contained in the polymerizable monomer composition is not particularly limited and is varied by the kind of the coloring agent to be used. It is in the range of 1–20 parts by weight, preferably 3–15 parts by weight, and more preferably 5–15 parts by weight, based on 100 parts by weight of the polymerizable monomer. If the amount of the coloring agent is less than 1 part by weight, the produced colored minute particles will have no sufficient degree of coloration. Conversely, if the amount exceeds 20 parts by weight, the excess of the amount will show no appreciable effect but entail the possibility of the polymerizable monomer composition suffering a sharp rise of viscosity and the polymerization of the polymerizable monomer failing to proceed sufficiently.

This invention requires the dispersion of the coloring agent in the polymerizable monomer described above to proceed in the presence of a dispersing agent (hereinafter referred to "coloring agent dispersing agent").

The first aspect of this invention poses no particular restriction on the dispersing agent except the requirement that the dispersing agent be capable of controlling the viscosity of the polymerizable monomer composition to or below 300 cP. At least one resin selected from the group consisting of rosin derivatives, aromatic petroleum resins, pinene type resins, epoxy type resins, coumarone resins, and styrene-acryl type resins is used particularly effectively.

The second aspect of this invention dictates, as an essential requirement, the use of at least one resin selected from the group consisting of rosin derivatives, aromatic petroleum resins, pinene type resins, epoxy type resins, coumarone resins, and styrene-acryl type resins as a coloring agent dispersing agent. When the treatment for the dispersion of the coloring agent in the polymerizable monomer in the presence of the specific resin, the stability of dispersion of the coloring agent in the polymerizable monomer is particularly improved, the dispersion of the coloring agent in the produced colored minute particles is uniformized, and the uniformity of the coloring agent content in the colored minute particles is heightened. In the polymerizable monomer composition which has undergone the treatment for the dispersion of the coloring agent in the polymerizable monomer in the presence of such a specific resin as mentioned above, since the coloring agent migrates only sparingly into the water phase during the course of the suspension in the aqueous suspending medium and the polymerization of the suspension, the residual ratio of the coloring agent in the produced colored minute particles is heightened and the problem of the pollution caused by the free coloring agent which has migrated into the water phase is eliminated.

As concrete examples of the rosin derivatives, rosin esters, hydrated rosin, hydrated rosin esters, rosins modified with a dibasic acid, and polymer rosins may be cited. As concrete examples of the aromatic petroleum resins, Neopolymers 1, L-90, 100, 120, 130, 140, 150, 160, and 170S (produced by Nippon Gosei Jushi K.K.) may be cited. As concrete examples of the pinene type resins, α-pinene resin and β-pinene resin may be cited. As concrete examples of the epoxy resins, various epoxy resins of the bisphenol A type, the halogenated bisphenol type, the resorcine type, the bisphenol F type, the novolak type, the polyalcohol type, the polyglycol type, the polyolefin type, and the alicyclic type which are solid or liquid at room temperature (25° C.±20° C.) may be cited. As concrete examples of the cumdrone resins, such coumarone-indene copolymers such as Squalon G-90, N-100, and V-120 (produced by Shinnittetsu Kagaku K.K.) may be cited. As concrete examples of the styrene-acryl type resins, such styrene-acryl type resins as are formed by using as main components one member or a mixture of two or more members selected each from the group consisting of such styrene type monomers as styrene, o-methyl styrene, m-methyl styrene, p-methyl styrene, α-methyl styrene, p-methoxy styrene, p-tert-butyl styrene, and p-phenyl styrene and the group consisting of such (meth) acrylic ester type monomers as methyl acrylate, ethyl acrylate, n-butyl acrylate, isobutyl acrylate, dodecyl acrylate, stearyl acrylate, 2-ethylhexyl acrylate, tetrahydrofurfuryl acrylate, glycidyl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, and glycidyl methacrylate and optionally having any of such olefin type resins as ethylene, propylene, butylene and any of such copolymerizable polymerizable monomers as vinyl chloride, vinyl acetate, acryl amide, and methacryl amide incorporated additionally therein may be cited. Other examples do not need to be excluded.

The coloring agent dispersing agent is preferred to be at least one resin selected from the group consisting of rosin derivatives having an acid number in the range of 5–100 KOH mg/g, aromatic petroleum resins having a weight average molecular weight of not more than 10000 and a softening point in the range of 70° C.–170° C., α-pinene type resins, epoxy type resins having a softening point in the range of 60° C. –150° C., coumarone resins, and styrene-acrylic type resins having a meight average molecular weight of not more than 100000.

In this invention, the coloring agent dispersing agent is preparatorily solved or dispersed in the polymerizable monomer and then the coloring agent is added to the polymerizable monomer or the coloring agent dispersing agent and the coloring agent are simultaneously added and then the treatment for the dispersion of the coloring agent is carried out by the use of a suitable stirring device. When the coloring agent dispersing agent happens to be deficient in solubility in the polymerizable monomer and to be solid near the room temperature, the polymerizable monomer is required for allowing homogeneous dispersion of the dispersing agent therein to be heated to a temperature at which the dispersing agent becomes soluble therein. Even when the coloring agent dispersing agent exhibit solubility in the polymerizable monomer, the heating may be performed for the purpose of promoting the solution.

The amount of the coloring agent dispersing agent to be added cannot be generally fixed because it is variable with the kinds of the coloring agent to be used and with the kind of the dispersing agent to be used. Appropriately, the amount of the dispersing agent is in the approximate range of 1–50 parts by weight, preferably 2–30 parts by weight, based on 100 parts by weight of the polymerizable monomer composition.

The reason for the range mentioned above is as follows. If the amount of the coloring agent dispersing agent is less than 1 part by weight, since the viscosity of the polymerizable monomer composition rises beyond 300 cP, the addition will not be so effective in improving the stability of dispersion of the coloring agent and in preventing the coloring agent from migrating into the water phase during the course of suspension and polymerization as is expected. Conversely, if the amount exceeds 50 parts by weight, the excess will not bring about a proportionate addition to the effect. Further, since the coloring agent dispersing agent has a relatively low molecular weight, the excess will possibly lower the strength of the produced print to withstand the pressure such as of printing.

The device to be employed for the treatment of dispersion of the coloring agent in the polymerizable monomer in the presence of the dispersing agent described above has no particular restriction. As concrete examples of the device to be employed preferably, such media type dispersing devices as ball mill, attriter, and sand mill, such shearing type dispersing devices as homomixer, homogenizer, and biomixer, and ultrasonic dispersing devices may be cited.

The polymerizable monomer composition, when necessary, may incorporate therein an offset preventing agent and a charge controlling agent.

The offset preventing agent optionally incorporated in the polymerizable monomer composition has no particular restriction. Polymers having a softening point (determined by the ring and ball method) in the range of 80–180° C., such as, for example polyolefins or so-called polyolefin waxes which have a weight average molecular weight in the approximate range of 1000–45000, preferably 200–600, can be used. As concrete examples of the polyolefin waxes, homo-polymers such as polyethylene, polypropylene, and polybutylene, olefin copolymers such as ethylene-propylene copolymer, ethylene-butene copolymer, ethylene-pentene copolymer, ethylene-3-methyl-1-butene copolymer, and ethylene-propylene-butene copolymer, and copolymers of olefins with other monomers such as, for example, vinyl ethers including vinyl methyl ether, vinyl-n-butyl ether, and vinylphenyl ether, vinyl esters including vinyl acetate and vinyl butyrate, haloolefins including vinyl fluoride, vinylidene fluoride, tetrafluoroethylene, vinyl chloride, vinylidene chloride, and tetrachloroethylene, (meth) acrylic esters including methyl acrylate, ethyl acrylate, n-butyl acrylate, methyl methacrylate, ethyl methacrylate, n-butyl methacrylate, stearyl methacrylate, N,N-dimethylaminoethyl methacrylate, and t-butylaminoethyl methacrylate, acrylic acid derivatives including acrylonitrile and N,N-dimethylacryl amide, organic acids including acrylic acid, methacrylic acid, maleic acid, fumaric acid, and itaconic acid, diethyl fumarate, and b-pinene may be cited.

As further concrete examples of the offset preventing agent, natural or synthetic paraffin waxes, particularly high-melting paraffin waxes having a melting point in the range of 60–70° C., fatty acid metal salts such as zinc salt, barium salt, lead salt, cobalt salt, calcium salt, and magnesium salt of stearic acid, zinc walt, manganese salt, iron salt, and lead salt of olefinic acid, and zinc salt, cobalt salt, and magnesium salt of palmitic acid, particularly higher fatty acid salts having not less than 17 carbon atoms, higher alcohols such as myricyl alcohol, polyalcohol esters such as glyceride stearate and glyceride palmitate, fatty acid esters such as myricyl stearate and myricyl palmitate, fatty partially saponified esters such as montanic partially saponified ester, higher fatty acids such as stearic acid, palmitic acid, and montanic acid, aliphatic acid amides such as ethylene bis-stearoyl amide, and mixtures thereof may be cited.

As concrete examples of the charge control agent, nigrosine, monoazo dye, zinc, hexadecyl succinate, alkyl esters or alkyl amides of naphthoeic acid, nitrofumic acid, N,N-tetramethyl diamine benzophenone, N,N-tetramethyl benzidine, triazine, and metal complexes of salicylic acid may be cited. This charge controlling agent is preferred to be externally added to the resin particles obtained after the suspension polymerization instead of being added during the course of suspension and polymerization.

The suspension polymerization system may incorporate therein a dispersion stabilizer for the purpose of stabilizing the suspended particles in the system. As concrete examples of the dispersion stabilizer, water-soluble macromolecular compounds such as polyvinyl alcohol, gelatin, tragacanth, starch, methyl cellulose, carboxy methyl cellulose, hydroxyethyl cellulose, polysodium acrylate, and polysodium methacrylate, surfactants such as sodium dodecyl-benzene sulfonate, sodium tetradecyl sulfate, sodium octyl sulfate, sodium ally-alkylpolyether sulfonate, sodium oleate, sodium laurate, sodium caprate, sodium caprylate, sodium caproate, potassium stearate, calcium oleate, sodium 3,3'-disulfodiphenyl urea-4,4'-diazobis-amino-8-naphthol-6-sulfonate, ortho-carboxybenzene-azo-dimethyl aniline, sodium 2,2',5,5'-tetramethyl-diphenyl methane-1,1'-diazo-bis-β-naphthol-disulfonate, sodium alkylnaphthalene sulfonate, sodium dialkyl-sulfosuccinate, sodium alkyl-diphenylether disulfonate, sodium polyoxyethylene alkyl sulfate, polyoxyethylene alkyl ether sulfuric acid triethanol amine, ammonium polyoxyethylene alkyl-phenyl ether sulfate, sodium alkali sulfonate, sodium salt of b-naphthalene sulfonic acid-formalin condensate, sodium salt of special aromatic sulfonic acid-formalin condensate, special carboxylic acid type macromolecular surfactant, polyoethylene lauryl ether, polyoxyethylene cetyl ether, polyoxyethylene stearyl ether, polyoxyethylene octylphenyl ether, polyoxyethylene nolylphenyl ether, polyoxyethylene sorbitan alkylates, lauryl trimethyl ammonium chloride, stearyl trimethyl ammonium chloride, cetyl trimethyl ammonium chloride, distearyl dimethyl ammonium chloride, and alkylbenzyl dimethyl ammonium chloride, and alginates, zein, casein, barium sulfate, calcium sulfate, barium carbonate, magnesium carbonate, calcium phosphate, talc, clay, diatomaceous earth, bentonite, titanium hydroxide, thorium hydroxide, and metal oxide powders may be cited.

In the first aspect of this invention, the polymerizable monomer composition which results from dispersing the coloring agent in the polymerizable monomer in the presence of the dispersing agent described above, consequently contains at least the polymerizable monomer and the coloring agent, and exhibits a viscosity of not more than 300 cP is subsequently added to and suspended in an aqueous suspending medium and suspension polymerized, with the viscosity of the resultant suspension controlled to or below 100 cP. As the dispersion stabilizer to be added to the aqueous suspending medium for the purpose of promoting the stabilization of the suspended particles, a surfactant is used particularly effectively for the reason stated above.

The dispersion stabilizer ought to be used with the composition and the amount of use thereof properly adjusted so that the produced colored minute particles may acquire a necessary particle diameter falling, for example, in the range of 1–100 μm, preferably 3–20 μm. When this stabilizer happens to be a water-soluble macromolecular compound, for example, it is appropriate to control the amount of this compound in the range of 0.1–10% by weight, preferably 0.5 –5% by weight, based on the amount of the polymerizable monomer. When the stabilizer happens to be a surfactant, it is appropriate to control the amount of this surfactant in the range of 0.01–5% by weight, preferably 0.05–3% by weight.

As the polymerization initiator to be used for the polymerization, an oil-soluble peroxide type or azo type initiator which is generally used for suspension polymerization can be utilized. As concrete examples of the polymerization initiator, peroxide type initiators such as benzoyl peroxide, lauroyl peroxide, octanoyl peroxide, benzoyl orthochloroperoxide, benzoyl orthomethoxy peroxide, methylethyl ketone peroxide, diisopropyl peroxy dicarbonate, cumene hydroperoxide, cyclo-hexanone peroxide, t-butyl hydroperoxide, and diisopropyl benzene hydroperoxide, and 2,2'-azobisisobutyronitrile, 2,2'-azobis (2,4-dimethyl valeronitrile), 2,2'-azobis(2,3-dimethyl butyronitrile), 2,2'-azobis(2-methylbutyronitrile), 2,2'-azobis(2,3,3-trimethyl butyronitrile), 2,2'-azobis(2-isopropyl butyronitrile), 1,1'-azobis(cyclohexane-1-carbonitrile), 2,2'-azobis(4-methoxy-2,4-dimethyl valeronitrile), 2-(carbamoylazo)isobutylonitrile, 4,4'-azobis (4-cyanovalephosphoric acid), and dimethyl-2,2'-azobis isobutyrate may be cited. The polymerization initiator is preferred to be used in an amount in the range of 0.1–20% by weight, preferably 1–10% by weight, based on the amount of the polymerizable monomer.

The suspension polymerization is effected by suspending in the aqueous medium the polymerizable monomer composition prepared by dispersing the coloring agent in the polymerizable monomer in the presence of the coloring agent dispersing agent mentioned above and heating the resultant suspension at a temperature in the range of 50–90° C., preferably 60–80° C., for example. After the suspension polymerization is completed, colored minute particles having a necessary average particle diameter in the approximate range of 1–100 μm, preferably 3–20 μm, can be obtained by separating the crude colored minute particles obtained at the and of the suspension polymerization, drying the separated minute particles, and optionally subjecting the dried minute particles to a step of classification.

The dispersion of the coloring agent in the colored minute particles of this invention obtained as described above is very satisfactory and the uniformity of this dispersion among the individual particles is high.

Since the migration of the coloring agent from the polymerizable monomer composition to the water phase during the course of suspension and polymerization is repressed to a low level by the use of at least one resin selected from the group consisting of rosin derivatives, aromatic petroleum resins, pinene type resins, epoxy type resins, coumarone resins, and styrene-acryl type resins as a coloring agent dispersing agent, the residual ratio of the amount of the coloring agent in the produced colored minute particles to the amount of the coloring agent (charged amount) in the polymerizable monomer composition is as high as not less than 70%, preferably not less than 90%. The content of the coloring agent in the colored minute particles is not less than 5% by weight, preferably not less than 6% by weight.

Besides, the stability of the composition during the course of polymerization is satisfactory and the yield of colored minute particles is as high as not less than 90% and the polymerization kettle is stained only sparingly and can be continuously used without requiring any special cleaning operation. This method proves highly efficient for the sake of commercialization.

The electrophotographic toner according to this invention can be obtained by using the colored minute particles produced as described above directly in their unmodified form or, when necessary, by subjecting the colored minute particles to a treatment for suitable external addition of a charge controlling agent intended for charge adjustment and a fluidifying agent, i.e. additives generally used in a static charge developing toner.

As concrete examples of the fluidifying agent, inorganic minute particles of colloidal silica, hydrophobic silica, hydrophobic titania, hydrophobic zirconia, and talc and organic minute particles such as polystyrene beads and (meth)acrylic resin beads may be cited.

The electrophotographic toner which is obtained as described above has an average particle diameter in the approximate range of 2–20 μm, preferably 3.5–15 μm and the individual toner particles contain the coloring agent amply in a uniformly dispersed state and the content of the coloring agent is uniform among the individual toner particles. When an image is formed with this toner, therefore, the produced image has a sufficient degree of coloration or density. Further, since the amount of electrification is uniform and stable among the individual toner particles, the produced image enjoys stability of quality without entraining such defects as fogging.

EXAMPLES

Now, this invention will be described more specifically below with reference to working examples.

Wherever "parts" and "%" are mentioned hereinafter, they shall be construed respectively as "parts by weight" and "% by weight" unless otherwise specified.

The viscosity, particle diameter, weight % of particles not less than 10 μm in diameter, and yield of colored minute particles were determined by the following methods.

Determination of Viscosity

A sample polymerizable monomer composition and a sample suspension were tested for viscosity with a B type viscosimeter (produced by TOKIMEC INC. and marketed under trademark designation of "Viscometer Model BM"). In the test, the sample kept at 25° C. was rotated at 60 rpm for one minute and the viscosity of the sample found at the end of the rotation was reported.

Determination of Particle Diameter and Weight % of Particles Not Less Than 10 μm in Diameter A sample was diluted and tested with an instrument (produced by Coulter Electronic, Inc. and marketed under trademark designation of "Coulter Multisizer II") to determine the captioned attributes.

Yield of Colored Minute Particles Obtained by Polymerization

A sample polymerization solution was passed through a sieve, 200 mesh in size, to remove coarse lumps and clusters and analyzed to determine a solid content, calculate the weight of colored minute particles by subtracting the amount of the suspension dispersion stabilizer (theoretical value) from the found solid content and calculate the yield based on the theoretical value. The yield was denominated in weight %.

Example 1

A polymerizable monomer composition was prepared with 256 parts of styrene, 45 parts of n-butyl acrylate, 0.9 part of divinyl benzene, 30 parts of carbon black (produced by Mitsubishi Chemical Co., Ltd. and marketed under product code of "MA-100"), 30 parts of maleic acid-modified rosin (produced by Rika-Hercules K.K. and marketed under trademark designation of Lewisol 28-JA (acid value 37)) as a dispersing agent, 3 parts of ABNR (2,2 azobisisobutyronitrile (produced by Nippon Hydrazine Kogyo K.K.), and 6 parts of ABNV (2,2-azobis (2,4-dimethylvaleronitrile) (produced by Nippon Hydrazine Kogyo K.K.).

The dispersing agent (maleic acid-modified rosin) for the polymerizable monomer composition was preparatorily solved in styrene, placed in conjunction with 130 parts of glass beads, 2.5 mm in diameter, in a mayonnaise glass vial, 450 ml in inner volume, and shaken by a paint shaker for 30 minutes to effect necessary dispersion. When the dispersed and mixed liquid of the polymerizable monomer composition was observed under an optical microscope, it was found to have carbon black uniformly dispersed in the form of minute particles and to be devoid of coarse particles exceeding 1 μm in diameter. The viscosity of this polymerizable monomer composition was found to be 125 cP.

This dispersed and mixed liquid of the polymerizable monomer composition was thrown into 480 parts of apreviously prepared aqueous 0.2% ammonium polyoxyethylene alkylphenyl ether sulfate (produced by Daiichi Kogyo Seiyaku K.K. and marketed under trademark designation of "Hitenol No. 8") solution and stirred with a homomixer (produced by Tokushu Kikako K.K.) at 10000 rpm for 15 seconds to obtain a suspension. When this suspension was observed under an optical microscope, it was found to have the individual particles uniformly colored in black and to contain absolutely no uncolored transparent particle.

The concentration of the polymerizable monomer composition in the suspension was 42.5% and the viscosity of the suspension was 75 cP. The proportion, in wt %, of the particles exceeding 10 μm was 1.2%.

Under an atmosphere of nitrogen, this suspension was uniformly stirred throughout to an extent not enough to induce settlement of polymer particles and heated and then left polymerizing at 70° C. for eight hours.

The polymerization was very stably completed without entraining either adhesion of polymer particles to the glass separable flask and the stirring vanes used for the polymerization or aggregation of polymer particles. The volume average particle diameter of the particles in the polymerization solution was 5.3 μm and the proportion, weight %, of particles exceeding 10 μm in diameter was 1.1%. The yield of colored minute particles was 98%.

Then, the polymerization solution was cooled to room temperature, subjected repeatedly to the steps of solid-liquid separation and washing, then dried in a hot air drier at 60° C. for 24 hours to obtain colored minute particles (1) of this invention. The filtrate resulting from the solid-liquid separation showed absolutely no sign of coloration with carbon black.

The colored minute particles (1) were adopted as electrophotographic toner (1). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

When the colored minute particles (1) were TEM (Transmission Electron Microscope) photographed and the TEM photograph was examined to determine the state of dispersion of carbon black, it was confirmed that carbon black was uniformly dispersed within the particles.

Example 2

A polymerizable monomer composition was prepared with 850 parts of styrene, 150 parts of n-butyl acrylate, 3 parts of divinyl benzene, 80 parts of carbon black (produced by Mitsubishi Chemical Co. K.K. and marketed under product code of "#44"), 40 parts of an aromatic petroleum resin (produced by Nippon Gosei Resin K.K. and marketed under trademark designation of "Neopolymer 100") as a dispersing agent, 20 parts of ABNR (produced by Nippon Hydrazine Kogyo K.K.), and 40 parts of ABNV (produced by Nippon Hydrazine Kogyo K.K.).

The dispersing agent (aromatic petroleum resin) for the polymerizable monomer composition was preparatorily solved in styrene and then subjected to a dispersing treatment with an instrument (produced by Will y A. Bachofen AG Maschinenfabrik and marketed under trademark designation of "Dyno-Mill KDL"). When the dispersed and mixed liquid of the polymerizable monomer composition was observed under an optical microscope, it was confirmed that carbon black was uniformly dispersed and no coarse particle was present. The viscosity of this polymerizable monomer composition was 200 cP.

The dispersion of the polymerizable monomer composition, 2500 parts in amount, was thrown into 4500 parts of a previously prepared aqueous 0.25% polyoxyethylene alkylphenyl ether (produced by Daiichi Kogyo K.K. and marketed under trademark designation of "Noigen EA150") solution and the resultant mixture was passed once through a homogenizer (produced by Ebara Seisakusho K.K. and marketed under trademark designation of "Ebara Milder") operated at 15000 rpm.

The concentration of the polymerizable monomer composition in the suspension was 26.3% and the viscosity of the suspension was 13 cP. The proportion, weight %, of the particles exceeding 10 $\mu$m was 3.0%.

Under an atmosphere of nitrogen, this suspension was uniformly stirred throughout to an extent not enough to induce settlement of polymer particles and heated and then left polymerizing at 75° C. for six hours. Similarly to Example 1, the polymerization was stably completed without entraining either adhesion or aggregation.

When this polymerization solution was tested for particle diameter with an instrument (produced by Coulter Electronic, Inc. and marketed under trademark designation of "Coulter Multisizer Π"), the weight average particle diameter was 6.8 $\mu$m and the proportion, weight %, of particles exceeding 10 $\mu$m in diameter was 2.8%. The yield of the colored minute particles was 95%.

Then, the polymerization solution was cooled to room temperature, subjected repeatedly to the steps of solid-liquid separation and washing, then dried in a hot air drier at 60° C. for 24 hours to obtain colored minute particles (2) of this invention. The filtrate resulting from the solid-liquid separation showed absolutely no sign of coloration with carbon black.

The colored minute particles (2) were adopted as electrophotographic toner (2). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer.

When this developer was set in a copying tester (produced by Toshiba K.K. and marketed under trademark designation of "Leodry 7610") and subjected to a copying test, a perfect image possessing a sufficient degree of density and showing no sign of fogging was obtained.

When the colored minute particles (2) were TEM photographed and the TEM photograph was examined to determine the state of dispersion of carbon black, it was confirmed that carbon black was uniformly dispersed within the particles.

Example 3

A polymerizable monomer composition (3) was obtained by faithfully following the procedure of Example 2 while using 120 g of α-pinene resin (produced by Yasuhara Chemical K.K. and marketed under trademark designation of "YS Resin A#800") instead as the dispersing agent for the polymerizable monomer composition of Example 2.

When the polymerizable monomer composition (3) after the treatment of dispersion was examined in the same manner as in Example 1, it was confirmed that carbon black was uniformly dispersed and coarse particles were absent. The viscosity of the polymerizable monomer composition was 250 cp.

A suspension was obtained in the same manner as in Example 2, using the dispersion of the polymerizable monomer composition. When this suspension was observed under an optical microscope, it was found to have the individual particles uniformly colored in black and to contain absolutely no uncolored transparent particle.

The concentration of the polymerizable monomer composition in the suspension was 27.8% and the viscosity of the suspension was 20 cP. The proportion, weight %, of the particles exceeding 10 $\mu$m was 5.0%.

The suspension was polymerized in the same manner as in Example 2.

The stability of polymerization was as perfect as in Example 2. The weight average particle diameter of the colored minute particles (3) was 7.3 $\mu$m and the proportion, weight %, of the particles exceeding 10 $\mu$m, was 5.2%. The yield of colored minute particles was 96%.

The filtrate resulting from the solid-liquid separation showed no sign of coloration with carbon black. The colored minute particles (3) were examined to determine the state of dispersion of carbon black in the particles in the same manner as in Example 1. It was consequently confirmed that carbon black was uniformly dispersed in the particles.

The colored minute particles (3) were adopted as electrophotographic toner (3). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer.

When this developer was tested for ability to form an image in the same manner as in Example 1, a perfect image possessing a sufficient degree of density and showing no sign of fogging was obtained.

Example 4

A polymerizable monomer composition (4) was obtained by faithfully following the procedure of Example 1 while using 60 parts of coumarone resin (produced by Shinnittetsu Kagaku K.K. and marketed under trademark designation of "Escuron N-100S") instead as the dispersing agent for the polymerizable monomer composition of Example 1. When the polymerizable monomer composition after the treatment for dispersion was examined in the same manner as in Example 1, it was confirmed that carbon black was uniformly dispersed and coarse particles were absent. The viscosity of the polymerizable monomer composition was 181 cP.

A suspension was obtained in the same manner as in Example 1, using the dispersion of the polymerizable monomer composition. When this suspension was observed under an optical microscope, it was found to have the individual particles uniformly colored in black and to contain absolutely no uncolored transparent particle.

The concentration of the polymerizable monomer composition in the suspension was 44.4% and the viscosity of the suspension was 11 cP. The proportion, weight %, of the particles exceeding 10 $\mu$m was 2.3%.

The suspension was polymerized in the same manner as in Example 1.

The stability of polymerization was as perfect as in Example 1. The weight average particle diameter of the colored minute particles (4) was 5.9 $\mu$m and the proportion, weight %, of the particles exceeding 10 $\mu$m, was 2.5%. The yield of colored minute particles was 97%.

The filtrate resulting from the solid-liquid separation showed no sign of coloration with carbon black. The colored minute particles (4) were examined to determine the state of dispersion of carbon black in the particles in the same manner as in Example 1. It was consequently confirmed that carbon black was uniformly dispersed in the particles.

The colored minute particles (4) were adopted as electrophotographic toner (4). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

Example 5

A polymerizable monomer composition (5) was obtained by faithfully following the procedure of Example 1 while using 80 parts of epoxy resin having a softening point (determined by the ring and ball method) of 78° C. (produced by Yuka-Shell Epoxy K.K. and marketed under trademark designation of Epikote 1002") as the dispersing agent in the polymerizable monomer composition of Example 1 and 20 parts of carbon black instead. When the polymerizable monomer composition after the treatment for dispersion was examined in the same manner as in Example 1, it was confirmed that carbon black was uniformly dispersed and coarse particles were absent. The viscosity of the polymerizable monomer composition was 103 cP.

A suspension was obtained from the dispersion of this polymerizable monomer composition by following the procedure of Example 1 while changing the amount of the aqueous 0.2% NO8 solution from 480 parts to 950 parts.

When this suspension was observed under an optical microscope, it was found to have the individual particles uniformly colored in black and to contain absolutely no uncolored transparent particle.

The concentration of the polymerizable monomer composition in the suspension was 29.5% and the viscosity of the suspension was 6.2 cP. The proportion, weight %, of the particles exceeding 10 $\mu$m was 5.0%.

The suspension was polymerized in the same manner as in Example 1.

The stability of polymerization was as perfect as in Example 1. The weight average particle diameter of the colored minute particles (5) was 6.3 $\mu$m and the proportion, weight %, of the particles exceeding 10 $\mu$m was 5.2%. The yield of colored minute particles was 98%.

The filtrate resulting from the solid-liquid separation showed no sign of coloration with carbon black. The colored minute particles (5) were examined to determine the state of dispersion of carbon black in the particles in the same manner as in Example 1. It was consequently confirmed that carbon black was uniformly dispersed in the particles.

The colored minute particles (5) were adopted as electrophotographic toner (5). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

Example 6

A polymerizable monomer composition (6) was obtained by faithfully following the procedure of Example 5 while using a styrene-acryl type resin (styrene/glycidyl methacrylate=95/5 (weight ratio), Mw=15000) instead as the dispersing agent in the polymerizable monomer composition of Example 5.

When the polymerizable monomer composition after the treatment for dispersion was examined in the same manner as in Example 1, it was confirmed that carbon black was uniformly dispersed and coarse particles were absent. The viscosity of the polymerizable monomer composition was 155 cP.

A suspension was obtained in the same manner as in Example 5 from the dispersion of the polymerizable monomer composition.

When this suspension was observed under an optical microscope, it was found to have the individual particles uniformly colored in black and to contain absolutely no uncolored transparent particle.

The concentration of the polymerizable monomer composition in the suspension was 29.5% and the viscosity of the suspension was 15 cP. The proportion, weight %, of the particles exceeding 10 $\mu$m was 3.8%.

The suspension was polymerized in the same manner as in Example 1.

The stability of polymerization was as perfect as in Example 1. The weight average particle diameter of the colored minute particles (6) was 6.8 $\mu$m and the proportion, weight %, of the particles exceeding 10 $\mu$m was 3.5%. The yield of colored minute particles was 96%.

The filtrate resulting from the solid-liquid separation showed no sign of coloration with carbon black. The colored minute particles (6) were examined to determine the state of dispersion of carbon black in the particles in the same manner as in Example 1. It was consequently confirmed that carbon black was uniformly dispersed in the particles.

The colored minute particles (6) were adopted as electrophotographic toner (6). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

Control 1

A polymerizable monomer composition (1) for comparison was obtained by following the procedure of Example 1 while omitting the addition of the dispersing agent to the polymerizable monomer composition of Example 1.

The polymerizable monomer composition after the treatment for dispersion was examined in the same manner as in Example 1.

When the dispersed and mixed liquid of this polymerizable monomer composition was observed under an optical microscope, it was found to have carbon black dispersed unsatisfactorily therein, contain coarse particles exceeding 1 μm in diameter, and induce readily secondary aggregation owing to the absence of stability of dispersion. The viscosity of this polymerizable monomer composition was 420 cP.

A suspension was obtained in the same manner as in Example 1 from the dispersion of the polymerizable monomer composition.

When this suspension was observed under an optical microscope, it was confirmed that the degree of density was not uniform among the individual particles and transparent particles were present.

The concentration of polymerizable monomer composition in the suspension was 40.8% and the viscosity of this suspension was 210 cP and the suspension exhibited thixotropy. The suspension was deficient in stability and could not tolerate a test with the instrument (produced by Coulter Electronic, Inc. and marketed under trademark designation of "Coulter Multisizer II").

This suspension was polymerized in the same manner as in Example 1.

The stability of polymerization of this suspension was not sufficient and, consequently, the adhesion of monomer particles to the glass separable flask and the stirring vanes used for the polymerization was fairly prominent.

The weight average particle diameter of the colored minute particles (1) for comparison obtained by the polymerization was 7.5 μm and the proportion, weight %, of the particles exceeding 10 μm in diameter was 15%. The yield of the produced colored minute particles (1) for comparison was 56%.

When the colored minute particles (1) for comparison were TEM photographed and the TEM photograph was examined to determine the state of dispersion of carbon black, it was confirmed that carbon black gathered near the surface regions of particles and was substantially absent from the central parts of the particles.

The filtrate resulting from solid-liquid separation was colored in black. This fact indicates that carbon black migrated to the water phase side.

The colored minute particles (1) were adopted as a toner (1) for comparison and a developer was produced in the same manner as in Example 1 from this toner (1). When this developer was subjected to a copying test, it was found that the developer had scattered the toner and the produced image formed a discernible fogging and had only a low degree of density.

Control 2

A polymerizable monomer composition (2) for comparison was obtained by following the procedure of Example 1 while using a phenol-terpene copolymer (produced by Yasuhara Chemical K.K. and marketed under trademark designation of "YS Polyster S145") instead as the dispersing agent in the polymerizable monomer composition of Example 1.

The polymerizable monomer composition after the treatment for dispersion was examined in the same manner as in Example 1.

When the dispersed and mixed liquid of this polymerizable monomer composition was observed under an optical microscope, it was found that carbon black was finely dispersed therein, contained no coarse particle, and tended to induce secondary aggregate because of low stability of dispersion. The viscosity of this polymerizable monomer composition was 350 cP.

A suspension was obtained from the dispersion of the polymerizable monomer composition by following the procedure of Example 1 while using 833 parts of water containing 3% of tricalcium phosphate and 0.04% of sodium dodecyl benzene sulfonate in the place of the aqueous 0.2% Hitenol NO8 solution of Example 1.

When this suspension was observed under an optical microscope, it was confirmed that the degree of density was not uniform among the individual particles and the presence of transparent particles was not discernible.

The concentration of polymerizable monomer composition in the suspension was 30% and the viscosity of this suspension was 120 cP and the suspension exhibited thixotropy. The proportion, weight %, of particles exceeding 10 μm in diameter was 18.5%.

This suspension was polymerized in the same manner as in Example 1.

The stability of polymerization of this suspension was relatively sufficient. The weight average particle diameter of the colored minute particles (2) for comparison obtained by the polymerization was 8.8 μm and the proportion, weight %, of the particles exceeding 10 μm in diameter was 15.8%. The yield of the produced colored minute particles (2) for comparison was 81%. When the colored minute particles (2) for comparison were TEM photographed and the TEM photograph was examined to determine the state of dispersion of carbon black, it was confirmed that carbon black was ununiformly dispersed in the particles.

The filtrate resulting from solid-liquid separation was colored in black. This fact indicates that carbon black migrated to the water phase side.

The colored minute particles (2) were adopted as a toner (2) for comparison and a developer was produced in the same manner as in Example 1 from this toner (2). When this developer was subjected to a copying test, it was found that the developer had scattered the toner and the produced image formed a discernible fogging and had only a low degree of density.

Control 3

A polymerizable monomer composition (3) for comparison was obtained by following the procedure of Example 1 while using 9 parts of p-carboxystyrene instead as the dispersing agent in the polymerizable monomer composition of Example 1.

The polymerizable monomer composition after the treatment for dispersion was examined in the same manner as in Example 1.

When the dispersed and mixed liquid of this polymerizable monomer composition was observed under an optical microscope, it was found that carbon black was finely dispersed therein, contained no coarse particle, and tended to induce secondary aggregate because of low stability of dispersion. The viscosity of this polymerizable monomer composition was 445 cP.

A suspension was obtained from the dispersion of the polymerizable monomer composition by following the procedure of Control 2.

When this suspension was observed under an optical microscope, it was confirmed that the degree of density was not uniform among the individual particles and the presence of transparent particles was not discernible.

The concentration of polymerizable monomer composition in the suspension was 28.8% and the viscosity of this suspension was 117 cP. The proportion, weight %, of particles exceeding 10 μm in diameter was 19.1%.

This suspension was polymerized in the same manner as in Example 1.

The weight average particle diameter of the colored minute particles (3) for comparison obtained by the polymerization was 8.1 μm and the proportion, weight %, of the particles exceeding 10 μm in diameter was 16.6%. The yield of the produced colored minute particles (3) for comparison was 73%. When the colored minute particles (3) for comparison were TEM photographed and the TEM photograph was examined to determine the state of dispersion of carbon black, it was confirmed that carbon black gathered near the surface regions of the particles.

The filtrate resulting from solid-liquid separation was colored in black. This fact indicates that carbon black migrated to the water phase side.

The colored minute particles (3) were adopted as a toner (3) for comparison and a developer was produced in the same manner as in Example 1 from this toner (3). When this developer was subjected to a copying test, it was found that the produced image had a certain degree of density but showed a sign of toner scattering and fogging.

Example 7

A polymerizable monomer composition was prepared with 85 parts of styrene, 15 parts of n-butyl acrylate, 0.3 part of divinyl benzene, 8 parts of carbon black (produced by Mitsubishi Chemical K.K. and marketed under product code of "MA-100"), 8 parts of maleic acid-modified rosin (produced by Rika-Hercules K.K. and marketed under trademark designation of Lewisol 28-JA (acid value 37)) as a dispersing agent, 1 part of ABNR (produced by Nippon Hydrazine Kogyo K.K.), and 2 parts of ABNV (produced by Nippon Hydrazine Kogyo K.K.).

The dispersing agent (maleic acid-modified rosin) for the polymerizable monomer composition was preparatorily solved in styrene, placed in conjunction with 130 g of glass beads, 2.5 mm in diameter, in a mayonnaise glass vial, 450 ml in inner volume, and shaken by a paint shaker for 30 minutes to effect necessary dispersion. When the dispersed and mixed liquid of the polymerizable monomer composition was observed under an optical microscope, it was found to have carbon black uniformly dispersed in the form of minute particles and to be devoid of coarse particles exceeding 1 μm in diameter and to exhibit satisfactory stability of dispersion.

The dispersed and mixed liquid of the polymerizable monomer composition was completely deprived of the glass beads, 2.5 mm in diameter, thrown into 480 g of an aqueous 1% polyvinyl alcohol (produced by Kuraray K.K. and marketed under trademark designation of "PVA 205") solution, and stirred by a homomixer (produced by Tokushu Kikako K.K.) at 8000 rpm for five minutes to obtain a suspension. When this suspension was observed under an optical microscope, it was found that the individual particles were uniformly colored in black and the presence of uncolored transparent particles was not discernible.

Under an atmosphere of nitrogen, this suspension was uniformly stirred throughout to an extent not enough to induce settlement of polymer particles and heated and then left polymerizing at 70° C. for eight hours. When this polymerization solution was tested for particle diameter with an instrument (produced by Coulter Electronic Inc. and marketed under trademark designation of "Coulter Multisizer II"), the weight average particle diameter was 6.4 μm.

Then, the polymerization solution was cooled to room temperature, subjected repeatedly to the steps of solid-liquid separation and washing, then dried in a hot air drier at 60° C. for 24 hours to obtain colored minute particles (7) of this invention.

The colored minute particles (7) were tested for carbon black content by a thermal analyzer (high-sensitivity Tg, produced by Shimadzu Seisakusho K.K. and marketed under product code of "TGA-50S"). The test was performed by heating the minute particles under an atmosphere of nitrogen from normal room temperature to 600° C. at a temperature increasing rate of 10° C./minute thereby effecting thorough decomposition of the polymer component, then heating the minute particles under an atmosphere of air to 1000° C. at the same temperature increasing rate, and finding the weight loss in % under the atmosphere of air thereby deciding the carbon black content. As a result, the carbon black content in the colored minute particles was found to be 6.8%. The residual ratio of carbon black in the colored minute particles is consequently 99%. The colored minute particles (7) were adopted as electro-photographic toner (7) This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

When the colored minute particles (7) for comparison were TEM photographed and the TEM photograph was examined to determine the state of dispersion of carbon black, it was confirmed that carbon black was uniformly dispersed in the particles.

Example 8

A polymerizable monomer composition was prepared with 850 parts of styrene, 150 parts of n-butyl acrylate, 3 parts of divinyl benzene, 80 parts of carbon black (produced by Mitsubishi Chemical Co. K.K. and marketed under product code of "#44"), 40 parts of an aromatic petroleum resin (produced by Nippon Gosei Resin K.K. and marketed under trademark designation of "Neopolymer 100") as a dispersing agent, 20 parts of ABNR (produced by Nippon Hydrazine Kogyo K.K.), and 40 parts of ABNV (produced by Nippon Hydrazine Kogyo K.K.).

The dispersing agent (aromatic petroleum resin) for the polymerizable monomer composition was preparatorily solved in styrene and then subjected to a dispersing treatment with an instrument (produced by Will y A. Bachofen AG Maschinenfabrik and marketed under trademark designation of "Dyno-Mill KDL"). When the dispersed and mixed liquid of the polymerizable monomer composition was observed under an optical microscope, it was confirmed that carbon black was uniformly dispersed and no coarse particle was present and the stability of dispersion was satisfactory.

A suspension was obtained by throwing the dispersion of the polymerizable monomer composition into 4800 g of previously prepared water containing 0.04% of sodium dodecyl benzene sulfonate and 4% of calcium phosphate and circulating the resultant mixture through a homogenizer (produced by Ebara Seisakusho K.K. and marketed under trademark designation of "Ebara Milder") operated at 15000 rpm for 10 minutes. When this suspension was observed under an optical microscope, it was found that the individual particles were uniformly colored in black and the presence of uncolored transparent particles was not discernible.

Under an atmosphere of nitrogen, this suspension was uniformly stirred throughout to an extent not enough to induce settlement of polymer particles and heated and then left polymerizing at 75° C. for six hours. When this polymerization solution was tested for particle diameter with an instrument (produced by Coulter Electronic, Inc. and marketed under trademark designation of "Coulter Multisizer Π"), the weight average particle diameter was 7.2 μm.

Then, the polymerization solution was cooled to room temperature, treated with hydrochloric acid to effect solution of calcium phosphate, subjected repeatedly to the steps of solid-liquid separation and washing, then dried in a hot air drier at 60° C. for 24 hours to obtain colored minute particles (8) of this invention.

The colored minute particles (8) were tested for carbon black content in the same manner as in Example 7. As a result, the carbon black content in the colored minute particles was found to be 7.1%. The residual ratio of carbon black in the colored minute particles therefore is 100%.

The colored minute particles (8) were adopted as electrophotographic toner (8). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained. When the colored minute particles (8) for comparison were TEM photographed and the TEM photograph was examined to determine the state of dispersion of carbon black, it was confirmed that carbon black was uniformly dispersed in the particles.

Example 9

Colored minute particles (9) were obtained by faithfully following the procedure of Example 8 while using 120 g of α-pinene resin (produced by Yasuhara Chemical K.K. and marketed under trademark designation of "YS Resin A#800") instead as the dispersing agent for the polymerizable monomer composition of Example 8. When the polymerizable monomer composition after the treatment of dispersion was examined in the same manner as in Example 1, it was confirmed that carbon black was uniformly dispersed and coarse particles were absent and the stability of dispersion was satisfactory. The weight average particle diameter of the colored minute particles (9) was 4.5 μm.

The colored minute particles (9) were tested for carbon black content in the colored minute particles in the same manner as in Example 1. As a result, the carbon black content in the colored minute particles was found to be 6.5%. The residual ratio of carbon black in the colored minute particles therefore is 98%.

The colored minute particles (9) were examined to determine the state of dispersion of carbon black therein in the same manner as in Example 1. As a result, it was confirmed that carbon black was uniformly dispersed in the particles.

The colored minute particles (9) were adopted as electrophotographic toner (9). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was subjected to a copying test in the same manner as in Example 1, a perfect image possessing a sufficient degree of density and showing no sign of fogging was obtained.

Example 10

Colored minute particles (10) were obtained by faithfully following the procedure of Example 7 while using 20 parts of coumarone resin (produced by Shinnittetsu Kagaku K.K. and marketed under trademark designation of "Escuron N-100S") instead as the dispersing agent for the polymerizable monomer composition of Example 7. When the polymerizable monomer composition after the treatment for dispersion was examined in the same manner as in Example 1, it was confirmed that carbon black was uniformly dispersed and coarse particles were absent. The stability of dispersion was perfect as well. The weight average particle diameter of the colored minute particles (10) was 5.9 μm.

The colored minute particles (10) were tested for carbon black content in the colored minute particles in the same manner as in Example 1. As a result, the carbon black content in the colored minute particles was found to be 6.7%. The residual ratio of carbon black in the colored minute particles therefore is 97%.

The colored minute particles (10) were examined to determine the state of dispersion of carbon black therein in the same manner as in Example 1. As a result, it was confirmed that carbon black was uniformly dispersed in the particles.

The colored minute particles (10) were adopted as electrophotographic toner (10). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

Example 11

Colored minute particles (11) were obtained by faithfully following the procedure of Example 7 while using 16 g of maleic acid-modified rosin [produced by Rika-Hercules K.K. and marketed under product code of "DP-180"(acid value 9)] instead as the dispersing agent in the polymerizable monomer composition of Example 7.

When the polymerizable monomer composition after the treatment for dispersion was examined in the same manner as in Example 7, it was confirmed that carbon black was uniformly dispersed and coarse particles were absent. The stability of dispersion was perfect as well. The weight average particle diameter of the colored minute particles (11) was 5.9 μm.

The colored minute particles (11) were tested for carbon black content in the colored minute particles in the same manner as in Example 7. As a result, the carbon black content in the colored minute particles was found to be 6.8%. The residual ratio of carbon black in the colored minute particles therefore is 99%.

The colored minute particles (11) were examined to determine the state of dispersion of carbon black therein in the same manner as in Example 7. As a result, it was confirmed that carbon black was uniformly dispersed in the particles.

The colored minute particles (11) were adopted as electrophotographic toner (11). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

Example 12

Colored minute particles (12) were obtained by faithfully following the procedure of Example 7 while using 12 g of an epoxy resin of a softening point (determined by the ring and ball method) of 78° C. [produced by Yuka-Shell Epoxy K.K. and marketed under trademark designation of Epikote 1002"] as the dispersing agent in the polymerizable monomer composition of Example 7 and 12 g of carbon black instead.

When the polymerizable monomer composition after the treatment for dispersion was examined in the same manner as in Example 12, it was confirmed that carbon black was uniformly dispersed and coarse particles were absent. The stability of dispersion was satisfactory as well. The weight average particle diameter of the colored minute particles (12) was found to be 5.3 μm.

The colored minute particles (12) were tested for carbon black content in the colored minute particles in the same manner as in Example 7. As a result, the carbon black content in the colored minute particles was found to be 10.1%. The residual ratio of carbon black in the colored minute particles therefore is 99.6%.

The colored minute particles (12) were examined to determine the state of dispersion of carbon black therein in the same manner as in Example 7. As a result, it was confirmed that carbon black was uniformly dispersed in the particles.

The colored minute particles (12) were adopted as electrophotographic toner (12). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

Example 13

Colored minute particles (13) were obtained by faithfully following the procedure of Example 8 while using a maleic acid-modified rosin (produced by Rika-Hercules K.K. and marketed under trademark designation of "Pentlyn 830" (acid value 79)) as the dispersing agent in the polymerizable monomer composition of Example 8 and using 4800 g of an aqueous 0.2% polyoxyethylene alkylphenyl ether ammonium sulfate (produced by Daiichi Kogyo Seiyaku K.K. and marketed under trademark designation of "Hitenol NO8") in the place of 4800 g of water containing 0.04% of sodium dodecylbenzene sulfonate and 4% of calcium phosphate.

When the polymerizable monomer composition after the treatment for dispersion was examined in the same manner as in Example 7, it was confirmed that carbon black was uniformly dispersed and coarse particles were absent. The stability of dispersion was satisfactory as well. The weight average particle diameter of the colored minute particles (13) was found to be 5.7 μm.

The colored minute particles (13) were tested for carbon black content in the colored minute particles in the same manner as in Example 7. As a result, the carbon black content in the colored minute particles was found to be 6.9%. The residual ratio of carbon black in the colored minute particles therefore is 97%. The colored minute particles (13) were examined to determine the state of dispersion of carbon black therein in the same manner as in Example 7. As a result, it was confirmed that carbon black was uniformly dispersed in the particles.

The colored minute particles (13) were adopted as electrophotographic toner (13). This toner and 0.3% of hydrophobic silica (produced by Nippon Aerosil K.K. and marketed under trademark designation of "Aerosil R-972") added thereto were thoroughly mixed, adjusted with a styrene-acrylic resin-coated ferrite carrier until a toner concentration of 4%, and mixed to produce a two-component developer. When this developer was set in a copying tester (produced by Toshiba K.K. and marketed under trademark designation of "Leodry 7610") and subjected to a copying test, a perfect image possessing a sufficient degree of density and showing no sign of fogging was obtained.

Control 4

Colored minute particles (4) for comparison were obtained by following the procedure of Example 7 while omitting the addition of the dispersing agent to the polymerizable monomer composition of Example 7. At varying subsequent steps, tests were performed in the same manner as in Example 7. When the dispersed and mixed liquid of the polymerizable monomer composition was observed under an optical microscope to determine the state of dispersion of carbon black in the liquid, it was found that the liquid suffered inferior dispersion of carbon black, contained coarse particles exceeding 1 μm in diameter, and readily induced secondary aggregation of particles on account of the absence of stability of dispersion.

When the suspension was observed under an optical microscope, it was found that the degree of density was not uniform among the individual particles and the presence of transparent particles was discernible.

The weight average particle diameter of the colored minute particles (4) for comparison obtained by polymerizing the suspension was found to be 5.8 μm. When the colored minute particles (4) for comparison were TEM photographed and the TEM photograph was examined to determine the state of dispersion of carbon black, it was confirmed that carbon black gathered near the surface regions of the particles and was substantially absent from the central parts of the particles.

The colored minute particles (4) for comparison were tested for carbon black content in the colored minute particles in the same manner as in Example 7. As a result, the carbon black content in the colored minute particles was found to be 2.8%. The residual ratio of carbon black in the colored minute particles therefore is 40%. The colored minute particles (4) for comparison were adopted as a toner (4) for comparison. When a developer was prepared from the toner (4) for comparison in the same manner as in Example 7 and then subjected to a copying test, it was found that the produced image had a low degree of density but showed a sign of toner scattering and fogging.

Control 5

Colored minute particles (5) for comparison were obtained by following the procedure of Example 7 while having 8 parts of the dispersing agent (produced by Rika-Hercules K.K. and marketed under trademark designation of "Lewisol 28-JA" (acid value 37)) in the polymerizable monomer composition of Example 7 added to and solved in the dispersed and mixed liquid of the polymerizable monomer composition after the treatment for dispersion of the coloring agent. At varying subsequent steps, tests were performed in the same manner as in Example 7. When the dispersed and mixed liquid of the polymerizable monomer composition was observed under an optical microscope to determine the state of dispersion of carbon black in the liquid, it was found that the liquid suffered inferior dispersion of carbon black, contained coarse particles exceeding 1 μm in diameter, and readily induced secondary aggregation of particles on account of the absence of stability of dispersion.

When the suspension was observed under an optical microscope, it was found that the degree of density was not uniform among the individual particles and the presence of transparent particles was discernible.

The weight average particle diameter of the colored minute particles (5) for comparison obtained by polymerizing the suspension was found to be 8.1 μm. When the colored minute particles (5) for comparison were TEM photographed and the TEM photograph was examined to determine the state of dispersion of carbon black, it was confirmed that carbon black gathered near the surface regions of the particles and was substantially absent from the central parts of the particles.

The colored minute particles (5) for comparison were tested for carbon black content in the colored minute particles in the same manner as in Example 7. As a result, the carbon black content in the colored minute particles was found to be 3.3%. The residual ratio of carbon black in the colored minute particles therefore is 46%. The colored minute particles (5) for comparison were adopted as a toner (5) for comparison. When a developer was prepared from the toner (5) for comparison in the same manner as in Example 7 and then subjected to a copying test, it was found that the produced image had a low degree of density but showed a sign of toner scattering and fogging.

Control 6

Colored minute particles (6) for comparison were obtained by following the procedure of Example 7 while using a phenol-terpene copolymer (produced by Yasuhara Chemical K.K. and marketed under trademark designation of "YS Polyster S145") instead as the dispersing agent in the polymerizable monomer composition of Example 7. At varying subsequent steps, tests were performed in the same manner as in Example 7. When the dispersed and mixed liquid of the polymerizable monomer composition was observed under an optical microscope to determine the state of dispersion of carbon black in the liquid, it was found that the liquid tended to induce secondary aggregation of particles on account of inferior stability of dispersion, though carbon black was dispersed and no coarse particles were contained.

When the suspension was observed under an optical microscope, the degree of density was not uniform among the individual particles and the presence of transparent particles was not discernible.

The weight average particle diameter of the colored minute particles (6) for comparison obtained by polymerizing the suspension was 7.8 μm. When the colored minute particles (6) for comparison were TEM photographed and the TEM photograph was examined to determine the state of dispersion of carbon black, it was confirmed that carbon black was not uniformly dispersed but was gathered in the particles.

The colored minute particles (6) for comparison were tested for carbon black content in the colored minute particles in the same manner as in Example 7. As a result, the carbon black content in the colored minute particles was found to be 3.8%. The residual ratio of carbon black in the colored minute particles therefore is 53%. The colored minute particles (6) for comparison were adopted as a toner (6) for comparison. When a developer was prepared from the toner (6) for comparison in the same manner as in Example 7 and then subjected to a copying test, it was found that the produced image had a low degree of density but showed a sign of toner scattering and fogging.

Control 7

Colored minute particles (7) for comparison were obtained by following the procedure of Example 7 while using 3 parts of p-carboxy styrene instead as the dispersing agent in the polymerizable monomer composition of Example 7. At varying subsequent steps, tests were performed in the same manner as in Example 7. When the dispersed and mixed liquid of the polymerizable monomer composition was observed under an optical microscope to determine the state of dispersion of carbon black in the liquid, it was found that the liquid tended to induce secondary aggregation of particles on account of inferior stability of dispersion, though carbon black was dispersed and no coarse particles were contained.

When the suspension was observed under an optical microscope, the degree of density was not uniform among the individual particles and the presence of transparent particles was not discernible.

The weight average particle diameter of the colored minute particles (7) for comparison obtained by polymerizing the suspension was 6.1 μm. When the colored minute particles (7) for comparison were TEM photographed and the TEM photograph was examined to determine the state of dispersion of carbon black, it was confirmed that carbon black gathered near the surface regions of particles.

The colored minute particles (7) for comparison were tested for carbon black content in the colored minute particles in the same manner as in Example 7. As a result, the carbon black content in the colored minute particles was found to be 4.2%. The residual ratio of carbon black in the colored minute particles therefore is 58%. The colored minute particles (7) for comparison were adopted as a toner (7) for comparison. When a developer was prepared from the toner (7) for comparison in the same manner as in Example 7 and then subjected to a copying test, it was found that the produced image had a certain degree of density but showed a sign of toner scattering and fogging.

What is claimed is:

1. A method for production of colored minute particles having an average particle diameter in the range of 1–100 μm, said method comprising suspending in an aqueous suspending medium a polymerizable monomer composition obtained by dispersing a coloring agent in a polymerizable monomer and then polymerizing the resultant suspension, wherein said dispersion of said coloring agent in said polymerizable monomer is performed in the presence of a dispersing agent, said polymerizable monomer composition exhibiting a viscosity of not more than 300 cP, and said suspension of said polymerizable monomer composition in said aqueous suspending medium exhibiting a viscosity of not more than 100 cP.

2. A method according to claim 1, wherein said dispersing agent for dispersing said coloring agent in said polymerizable monomer is at least one resin selected from the group consisting of rosin esters, hydrated rosin, hydrated rosin esters, rosins modified with a dibasic acid, polymer rosins, aromatic petroleum resins, pinene resins, epoxy resins, coumarone resins, and styrene-acrylic resins.

3. A method for producing colored minute particles having an average particle diameter in the range of 1–100 μm, said method comprising suspending in an aqueous suspending medium a polymerizable monomer composition obtained by dispersing a coloring agent in a polymerizable monomer and polymerizing the resultant suspension, wherein said dispersion of said coloring agent in said polymerizable monomer is performed in the presence of at least one resin selected from the group consisting of rosin esters, hydrated rosin, hydrated rosin esters, rosins modified with a dibasic acid, polymer rosins, aromatic petroleum resins, pinene resins, epoxy resins, coumarone resins, and styrene-acrylic resins and the residual ratio of said coloring agent in said colored minute particles is not less than 70% by weight.

4. A method according to claim 3, wherein said dispersing agent for dispersing said coloring agent in said polymerizable monomer is used in an amount in the range of 1–50 parts by weight, based on 100 parts by weight of said polymerizable monomer composition obtained by dispersing said coloring agent in said polymerizable monomer.

5. A method according to claim 3, wherein said dispersing agent for dispersing said coloring agent in said polymerizable monomer is at least one resin selected from the group consisting of rosin derivatives having an acid number in the range of 5–100 KOH mg/g, wherein said rosin derivatives are selected from the group consisting of rosin esters, hydrated rosin, hydrated rosin esters, rosins modified with a dibasic acid, and polymer rosins, aromatic petroleum resins having a weight average molecular weight of not more than 10000 and a softening point in the range of 70° C.–170° C., α-pinene resins, epoxy resins having a softening point in the range of 60° C.–150° C., coumarone resins, and styrene-acrylic resins.

6. Colored minute particles having an average particle diameter in the range of 1–100 μm obtained by the method set forth in any of claims 1–5.

7. Colored minute particles according to claim 6, wherein said colored minute particles contain at least one resin selected from the group consisting of rosin esters, hydrated rosin, hydrated rosin esters, rosins modified with a dibasic acid, polymer rosins, aromatic petroleum resins, pinene resins, epoxy resins, and coumarone resins and the content of said coloring agent in said colored minute particles is not less than 5% by weight.

8. An electrophotographic toner characterized by containing colored minute particles set forth in claim 6.

9. A method according to claim 3, wherein said resin is used in an amount in the range of 1–50 parts by weight, based on 100 parts by weight of said polymerizable monomer composition obtained by dispersing said coloring agent in said polymerizable monomer.

10. Colored minute particles obtained by the method set forth in claim 9.

11. An electrophotographic toner comprising the colored minute particles set forth in claim 10.

* * * * *